No. 852,160. PATENTED APR. 30, 1907.
J. W. BOLTZ.
DRY PAN CRUSHER.
APPLICATION FILED NOV. 28, 1906.

2 SHEETS—SHEET 1.

Witnesses
Inventor
Jacob W. Boltz
By J. A. Rosen, Atty

No. 852,160. PATENTED APR. 30, 1907.
J. W. BOLTZ.
DRY PAN CRUSHER.
APPLICATION FILED NOV. 28, 1906.

2 SHEETS—SHEET 2.

Witnesses
Inventor
Jacob W. Boltz

UNITED STATES PATENT OFFICE.

JACOB W. BOLTZ, OF TOPEKA, KANSAS.

DRY-PAN CRUSHER.

No. 852,160.  Specification of Letters Patent.  Patented April 30, 1907.

Application filed November 28, 1906. Serial No. 345,483.

*To all whom it may concern:*

Be it known that I, JACOB W. BOLTZ, a citizen of the United States, residing at Topeka, in the county of Shawnee and State of Kansas, have invented new and useful Improvements in Dry-Pan Crushers, of which the following is a specification.

The invention relates to the well known dry-pan crusher used in the dry crushing of clay in the process of making brick and other clay products; and, these dry-pan crushers comprise mainly a frame, a central shaft, a pan secured to the shaft and rotated thereby the pan having a grated or perforated bottom, mullers riding loosely on the bottom of the pan to crush the clay, and plows to direct the clay under the mullers. In the operation of these dry-pan crushers, much delay and extra expense are caused by reason of the large lumps of clay getting between the mullers and the pan and clogging the mullers while the pan continues to rotate, this is especially troublesome when crushing very hard clay and in crushing frozen clay; in the latter case the large frozen lumps easily stop the mullers and simply slide over the bottom of the pan; this causes the clay to pile up, necessitating stopping the machine and breaking up the lumps by hand as with a sledge or other suitable tool. Another item of expense and delay is that the gratings or perforations themselves become stopped up by the clay, and this requires that the machine be stopped and the bottom scraped.

Objects of my invention are to make provision in the crusher for breaking up these large lumps so that they will pass under the mullers and thus preventing clogging or stopping of the machine, and to provide for keeping the gratings or perforations always open.

The invention consists mainly in providing projections on the pan between the mullers and the shaft for breaking or cutting up the lumps and in providing a rake-like device, that is a toothed device, which rests on the perforated part of the pan bottom and which keeps the clay thereon agitated and thus preventing stopping of the perforations, without pushing the clay off of the grated part. It consists further of the parts, improvements, and combinations hereinafter set forth and claimed.

Figure 1:
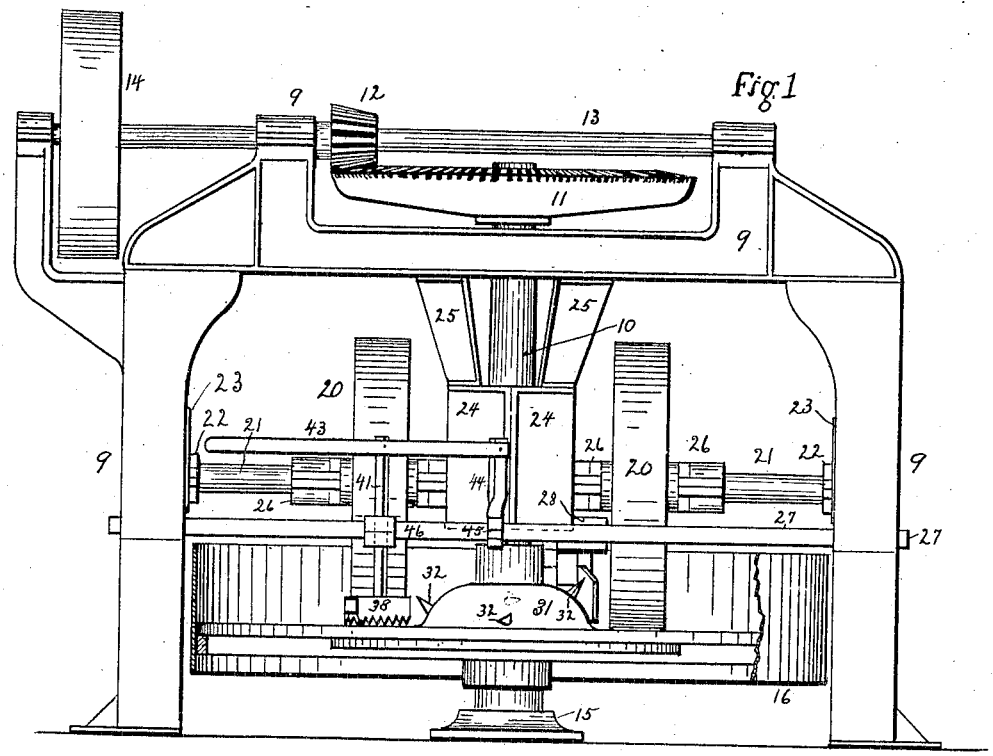
Figure 2:
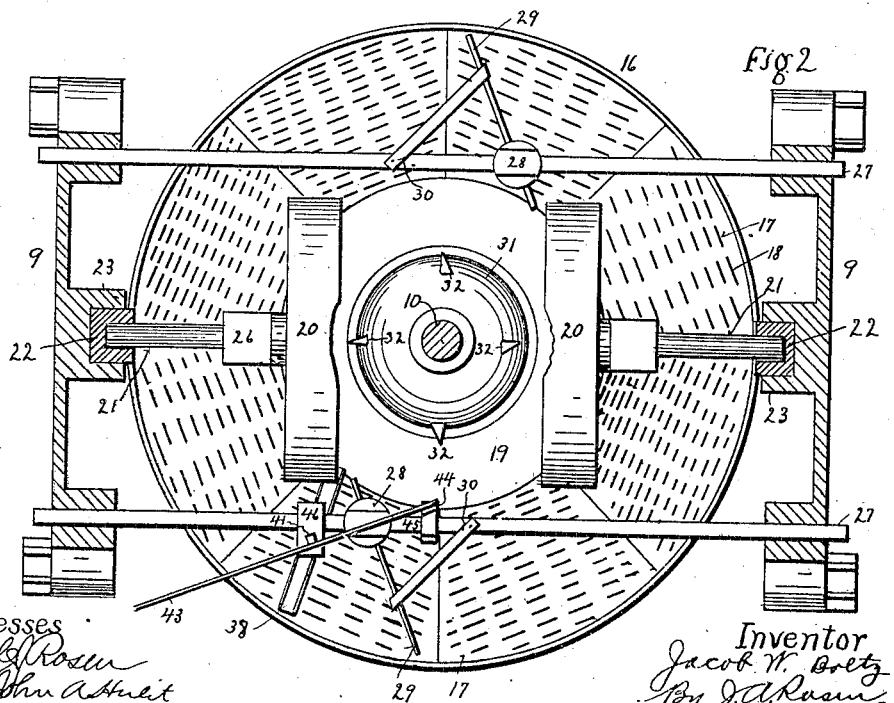
Figure 3:
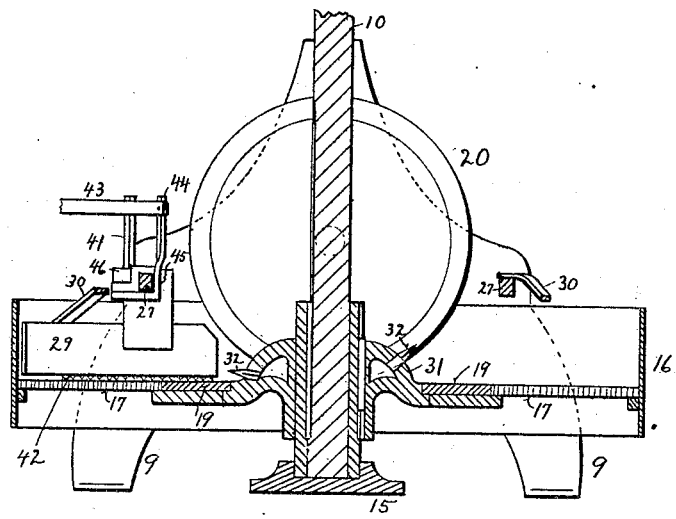
Figure 4:
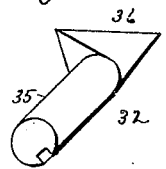
Figure 5:
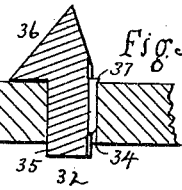
Figures 6, 7:
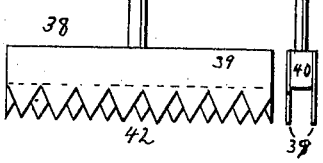
Figure 8:
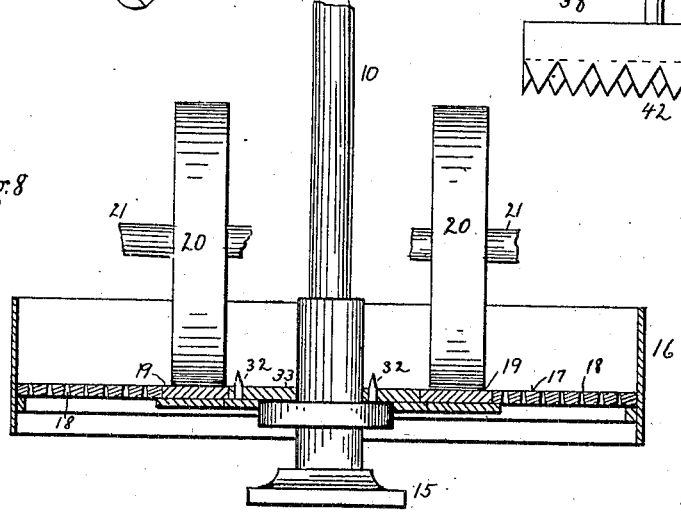

Figure 1 is an elevation view of a common kind of dry-pan crusher with my improvements attached, the near plow and a portion of the side of the pan being removed in order to disclose the improvements. Fig. 2 is a top view, certain parts being shown in section and other parts being broken away. Fig. 3 is a sectional view. Fig. 4 is a view of one form of projection or tooth; and Fig. 5 is a sectional view showing a method of attaching it. Fig. 6 is a side view, and Fig. 7 is an end view, of the rake attachment. Fig. 8 is a sectional view of a dry-pan of a modified form with part of my improvements applied thereto.

Like reference numerals indicate like or corresponding parts throughout the several views.

9 is the frame, 10 is the main or center shaft to the upper end of which is attached the large gear 11 driven by the smaller gear 12 on shaft 13 which is driven by a pulley 14 to which the power that operates the machine is applied; and 15 is the block which forms the lower bearing for the main or center shaft 10.

16 is a circular pan supported on and keyed to the shaft 10. The outer portion 17 of the pan bottom is grated or perforated 18, and just within the gratings is the wearing-board 19 on which are supported the two mullers 20, 20. These mullers are mounted, either loosely or keyed, on the shafts 21, 21, respectively. The ends of each shaft bear in blocks 22 which move freely and vertically in the guides or ways 23, 23, the guides for the inner ends of the shafts being indicated by 24, 24, supported from the top by the brackets 25, 25. By this arrangement, the mullers are held in position, while being permitted to move vertically to allow for variations in the clay passing under them. They are rotated by the pan as the latter is rotated by the main center shaft, and the wearing-board is so made that it may be replaced from time to time as it wears out.

26, 26 are clamps or hubs to keep the mullers in place on the shafts.

Extending from side to side of the frame are two rods 27, 27 to each of which is secured a bracket or clamp 28, 28, to which is secured a plow 29 which reaches nearly but not fully to the bottom of the pan, and which extends diagonally across the perforated part of the pan bottom. A brace 30 aids in holding the plow rigid. The purpose of the plow is to turn the clay under the muller, there being a plow in front of each muller, so that the clay may be crushed, and at the same time permitting the finer clay to remain on the gratings, passing under the plow, and sifting down therethrough.

The inner or hub portion of the pan, in most dry-pan crushers is bell-shaped or conical as shown at 31, although it may be of any other form, as being square or flat, as in Fig. 8 at 33. The bell-shaped or conical hub is preferable, however both for strength and for the purpose of preventing the accumulation of clay in the middle of the pan.

The parts above described are well known in the art, and therefore need no further detailed description; but without the improvements hereinafter described, the difficulties hereinbefore described are met with, namely, the large lumps coming in front of the mullers raise the mullers off the wearing-board and the pan merely slips under the lumps and under the mullers without forcing the lumps under or breaking them up, thus causing an accumulation of clay and necessitating breaking up the lumps by hand, and the finer clay frequently becomes matted on the gratings stopping the passages therethrough.

One part of my invention consists in placing projections from the pan between the mullers and the center shaft. These projections rotate positively with the pan. Obviously, they may be fastened either to the shaft, to the hub, or to the bottom of the pan. In Figs. 4 and 5 I have shown a form of projection which may be applied to dry-pan crushers in a simple manner. It may consist of a shank 35 and a pointed head 36, and may be inserted in a hole drilled in the hub and set firmly therein with a wedge or key 37. These projections may be arranged quarterly around on the conical hub, as shown at 32, 32, 32, 32, in Fig. 2, and may be of graduated height from the bottom up and from the shaft out. The large lumps, which are large enough to clog the mullers, are forced inwardly against these projections, and the projections quickly cut or break up the lumps into the smaller sizes which pass under the mullers. If these projections were fastened onto the mullers themselves, they would of course stop with the clogging of the mullers; but by placing them so that they rotate positively with the pan, they will always be in operation even while the mullers are temporarily clogged, with the result that the large lumps are torn to pieces until they pass under the mullers.

Another part of my invention consists of the rake which is supported on the gratings. This rake may consist of the two pieces of tough steel 39, 39 separated and secured to a block 40, the lower edges being provided with teeth 42, 42 arranged alternately in the two plates. A rod 41 extends up from the rake (the rake as a whole being indicated by the numeral 38) and is pivoted to a lever handle 43, the other end of which is pivoted to a rod 44 which extends up from a bracket 45 on rod 27. Rod 41 passes through a block 46 on the same rod 27. The purpose of this rake is to keep the finer part of the clay which passes under the plow, agitated, so that it will not mat or clog up the openings through the grate. And this it does without pushing the clay off of the gratings. However, the rake should be diagonally disposed so that any large particles which do not pass between the teeth of rake will be pushed over under the mullers. Normally the rake merely rests on the pan bottom by its own weight, but greater weight may, if desired be placed thereon, and it may be lifted by hand off of the gratings.

What I claim is:

1. The combination of a frame, a vertical central shaft, a circular pan secured to the shaft and having an outer grated portion, a wearing-board, and a conical hub, mullers mounted loosely on the wearing-board to crush the clay, and plows to force the clay onto the wearing-board and under the mullers; with projections from the conical hub; and a toothed implement resting on the grated portion and diagonally disposed so as to push the larger lumps toward the wearing-board.

2. The combination with a frame, a vertical central shaft, a circular pan secured to the shaft and having an outer grated portion, a wearing-board, and a conical hub, mullers loosely mounted on the wearing-board to crush the clay, and plows to force the clay onto the wearing-board and under the mullers; of projections on the conical hub between the mullers and the shaft.

3. The combination with a frame, a vertical central shaft, a circular pan secured to the shaft and having an outer grated portion, a wearing-board, and a hub, mullers loosely mounted on the wearing-board to crush the clay, and plows to force the clay onto the wearing-board and under the mullers; of projections on the hub between the mullers and the shaft.

In testimony whereof I have hereunto signed my name in the presence of witnesses.

JACOB W. BOLTZ.

Witnesses:
F. C. BOLTZ,
JOSEPH GROLL.